Jan. 24, 1961

A. FOREMAN ET AL 2,968,809

COMPONENT ASSEMBLY APPARATUS

Filed June 1, 1959

4 Sheets-Sheet 1

INVENTORS
Alexander Foreman
Guy M. Grimaldi
BY
Robert E. Strausser
ATTORNEY

Jan. 24, 1961 A. FOREMAN ET AL 2,968,809

COMPONENT ASSEMBLY APPARATUS

Filed June 1, 1959 4 Sheets-Sheet 2

INVENTORS
Alexander Foreman
Guy M. Grimaldi

BY Robert E. Strauss
ATTORNEY

INVENTORS
Alexander Foreman
Guy M. Grimaldi
BY
Robert E. Strausser
ATTORNEY

INVENTORS
Alexander Foreman
Guy M. Grimaldi
BY
Robert E. Strausser
ATTORNEY 2,968,809

COMPONENT ASSEMBLY APPARATUS

Alexander Foreman, Warren, and Guy M. Grimaldi, North Warren, Pa., assignors to Sylvania Electric Products Inc., a corporation of Delaware Filed June 1, 1959, Ser. No. 817,184
8 Claims. (Cl. 1—3)

This invention relates to apparatus for inserting the connecting leads of components into apertured electrical chassis and more particularly to apparatus for assembling sockets and the like to an apertured printed circuit board.

Increased production costs have necessitated the mechanization of the assembly operations in the production of complex electronic apparatus such as television sets and the like. Mechanization of the assembly process in turn has required the provision of apparatus capable of positioning and assembling the electrical components upon the chassis employed in the apparatus. Generally, the chassis is provided with apertures for receiving the component leads. The assembly of components having coaxial leads, such as resistors and capacitors, into apertures in the chassis is complex and beset with many problems. However, the insertion difficulties encountered with components having a plurality of depending leads or connectors, such as tube sockets and IF transformers, are much more acute due to the problems of alignment or of maintaining previously aligned components in proper position relative to the apertured electrical chassis. Therefore, it is an object of this invention to automatically insert electrical components having a plurality of depending connectors into an apertured electrical chassis.

It is another object of this invention to provide simple, relatively low cost apparatus which is capable of maintaining the component to be inserted in its oriented position prior to and during its insertion into an apertured chassis.

In all manufacturing operations, the space required by the machinery employed in the operation is of economic importance. This is particularly true in the automatic assembly of electronic components upon chassis such as the printed circuit boards employed in electronic equipment since each component is individually inserted. Installation of a large number of components requires the application of a large number of assembly machines. Certain prior apparatus was bulky and required movement of the entire machine to change the angular position of the socket with respect to a given dimension of the printed circuit board. Therefore, it is yet another object of this invention to diminish the amount of space required for automated assembly equipment. It is still another object of this invention to enable a change to be made in the angular position of the inserted component without requiring the entire assembly apparatus to be re-positioned.

The foregoing objects are achieved in one aspect of the invention by the provision of an apparatus for assembling components upon a chassis including the combination of a magazine having a given operational axis for maintaining a plurality of components in an oriented position relative to the axis of the magazine, component lead inserting means mounted for reciprocating movement from a loading position at the magazine to a lead inserting position at the chassis along the axis of the magazine, means for releasably retaining the bottommost component in the magazine at the component loading position, means mounted on the magazine adjacent the loading position and operable by the inserting means to restrain the movement of the components in the magazine while the component inserting means is raised whereby the bottommost component is passed through and into the component inserting means, and means for moving the inserting means. The inserting means, the restraining means and the arresting means are mounted for rotational adjustment about the operational axis.

For a better understanding of the invention, reference is made to the following description taken in conjunction with the accompanying drawings in which.

Figure 1:
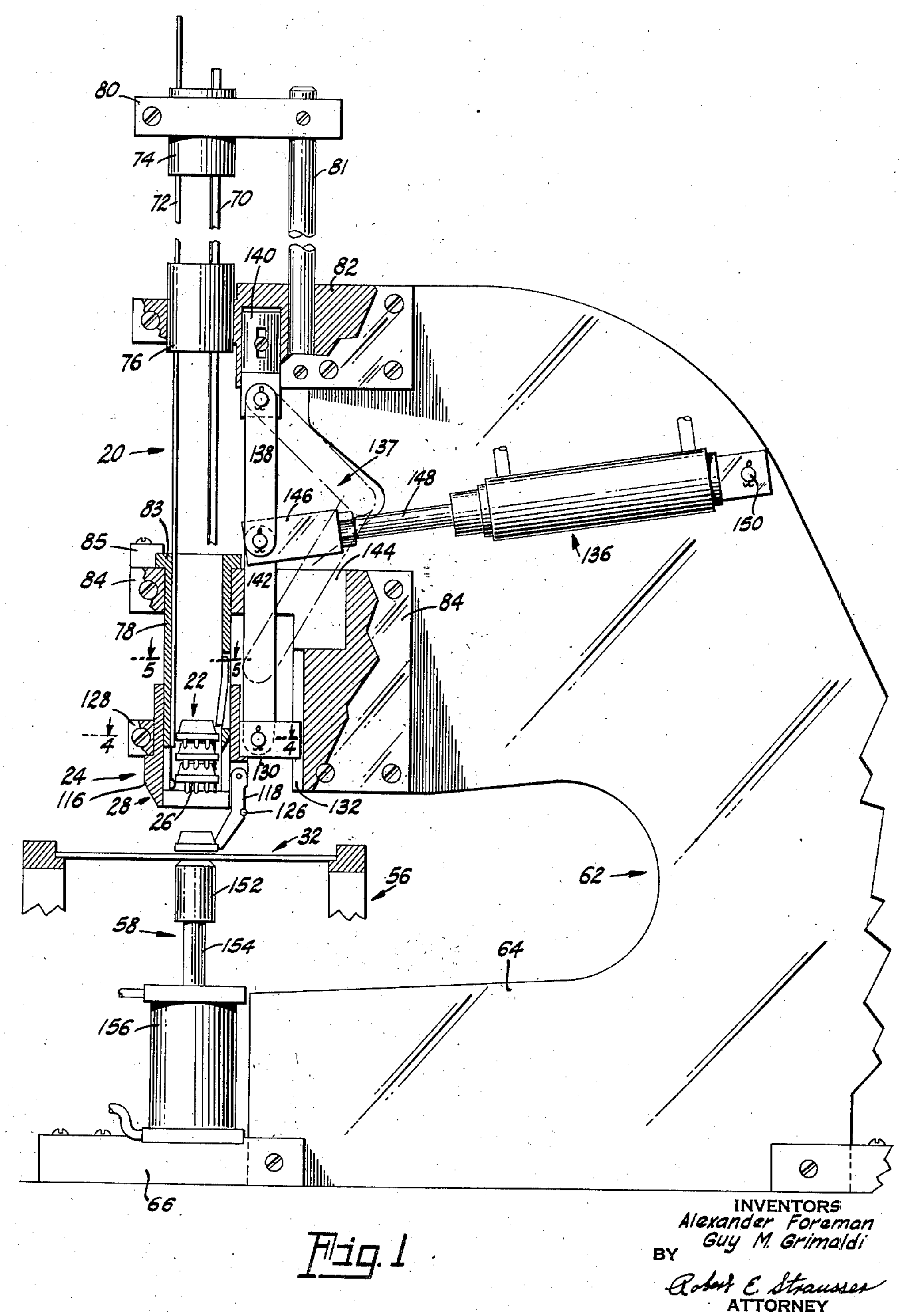
Fig. 1 is a side elevation of the apparatus with some parts omitted and other parts broken away in the interests of simplicity and clarity.
Figure 2:
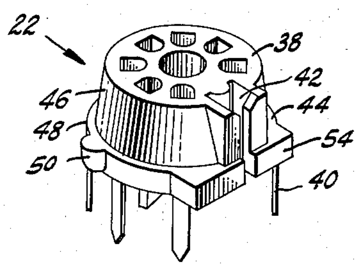
Fig. 2 is a perspective view of a socket which can be inserted by the subject apparatus.
Figure 3:
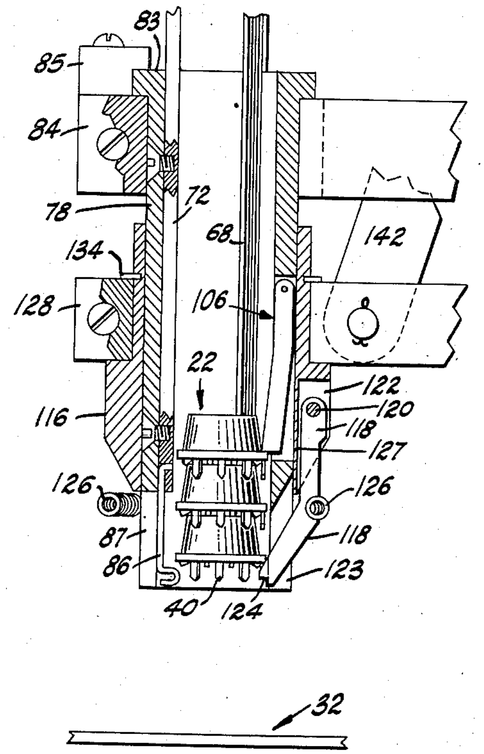
Fig. 3 is a perspective view showing the socket of Fig. 2 inserted into an apertured electrical chassis.
Figure 3:
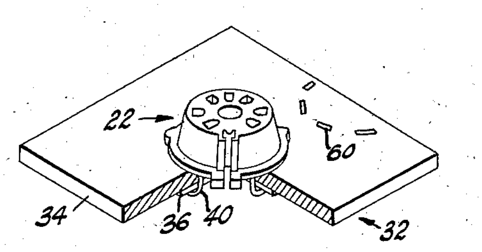

Referring to Figs. 1, 2 and 3 the apparatus has component holding means or magazine 20 which maintains a serially stacked array of pre-oriented sockets 22 with depending connectors or leads in the position in which they were delivered to the apparatus. Each reciprocation of the socket inserting head 24 picks up and transfers the bottommost socket 26 from a socket loading position indicated at 28 at the lower end of the magazine to a socket inserting position adjacent the printed circuit board or chassis 32 positioned beneath the head. The printed circuit board employed as a chassis comprises an insulating base 34 upon which the desired wiring pattern has been placed in the form of deposited or applied metallic conductors 36.

The particular socket illustrated in Fig. 2 is shown and described in United States Patent 2,863,131, issued December 2, 1958, entitled "Tube Socket" and assigned to the same assignee as the present invention. It comprises an insulating housing 38 having a plurality of depending solder lug conectors 40. The housing has an indexing channel 42 which extends along one side of the housing from the top to the bottom and in which a tube shield grounding strap (not shown) may be inserted after the socket has been mounted on a printed circuit board. The housing is provided with a cylindrical base portion 44, a frusto-conical upper portion 46 and an intermediate annular shoulder 48. Orienting protrusions 50, 52 and flat 54 are formed as part of the base portion 44. The purpose of the orienting protrusions will be more fully explained later.

The indexing channel 42 is used to pre-orient the sockets in the package in which they are delivered to the apparatus. A socket package of this type is shown and described in an application for United States patent, Serial Number 617,425, filed October 17, 1956, entitled "Socket Package", now Patent No. 2,947,184 and assigned to the same assignee as the present invention.

The printed circuit board 32 is accurately positioned beneath the inserting head by an indexible conveyor 56. A conveyor adapted to be operated in a production line having machines of the type illustrated in the drawings is shown and described in United States Patent 2,873,513, issued February 17, 1959, entitled "Automatic Assembly Apparatus" and assigned to the same assignee as the present invention.

Control means (not shown) for the apparatus is connected with the control means of the conveyor so that the insertion head 24 and the synchronized support or staking means 58 will operate only during the dwell period of the conveyor. At this time the apertures 60 in the printed circuit board will be accurately positioned beneath the inserter head 24 with respect to the component leads 40 to be inserted therein.

The magazine 20, in which a plurality of sockets are placed, is mounted on the frame 62. The frame 62 comprises a substantially C-shaped side member 64 having deep throat through which the conveyor 56 passes, affixed to a base member 66. The base 66 is used to mount the apparatus at the desired work station relative to the conveyor.

Figure 4:
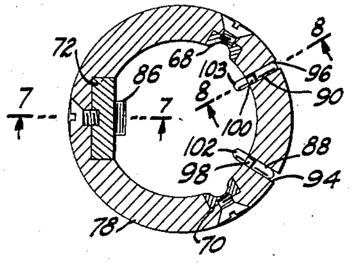
Fig. 4 is a fragmentary cross-sectional view of the magazine portion of the apparatus taken along the line 4—4 of Fig. 1.

Referring to Figs. 1 and 4 the sockets 22 are kept in the pre-oriented position in which they are delivered to the magazine 20 by engaging the orienting protrusions or boss 50, 52 with the respective channels 68, 70 and the socket flat 54 with the rail 72. The channels and rail extend the length of the magazine and are held in an upper ring 74, middle ring 76, and sleeve 78. The upper ring 74 is adjustably clamped in position by a split block 80 which is held by rod 81 affixed to another clamping block 82 that also holds the middle ring 76. Split block 82 is in turn fastened to the side plate 64. The sleeve 78 is retained in position by the clamping block 84 and by cooperation of the shoulder 83 and the screw operated clamp 85. Magazine 20 may be rotated about its vertical axis by loosening the aforementioned split blocks and clamps to change the angular position of the entire stack of oriented sockets relative to the chassis.

Figure 7:
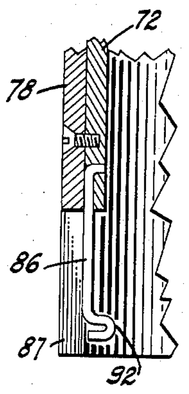
Fig. 7 is a fragmentary cross-sectional view taken along a line 7—7 of Fig. 4.
Figure 8:
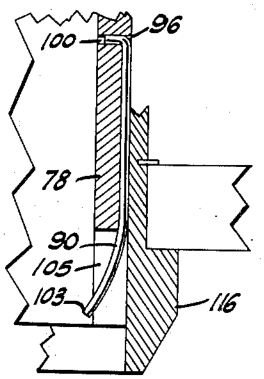
Fig. 8 is a fragmentary cross-sectional view taken along a line 8—8 of Fig. 4.

The stacked sockets 22 are releasably retained at the socket loading position 28 in the magazine by the combined supporting action of a flat spring 86 and contoured wire springs 88, 90 on the bottommost socket 26. The flat spring 86 is clamped in position, at one end, between the rail 72 and the sleeve 78 and is able to flex into the slot 87 in the sleeve as shown in Fig. 7 when it is necessary to allow the passage of the bottommost socket. The socket rests on the lip 92 formed on the free end of the spring. Wire springs 88, 90 are held in grooves 94, 96 respectively in the sleeve with one end of each spring secured in a hole 98, 100 through the sleeve wall. The socket 26 also rests on the free ends 102, 103 of the wire springs 88, 90 which extend into the magazine through slots 105 in the sleeve 78 (see Fig. 8).

Figure 5:
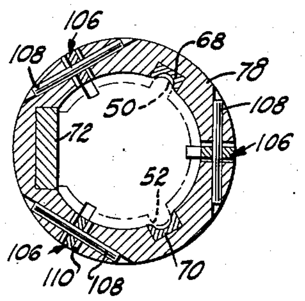
Fig. 5 is also a fragmentary cross-sectional view of the apparatus taken along the line 5—5 of Fig. 1.
Figure 9:
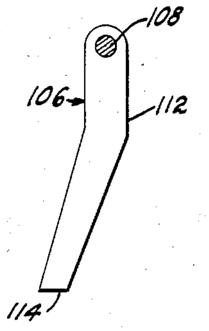
Fig. 9 is a side elevation of a component movement restraining pawl.

Socket movement restraining pawls 106, whose function will be later explained, are pivotally mounted on pins 108 in slots 110 formed in the sleeve 78 (see Figs. 5 and 9). The pawls each have a side portion 112, between the pivot pin 108 and the free end 114, shaped as an edge cam. The free end 114 is adapted to contact the annular shoulder 48 of the sockets when the pawl is operated. When at rest, the pawl is free to pivot away from the stack of sockets in the magazine.

Figure 6:
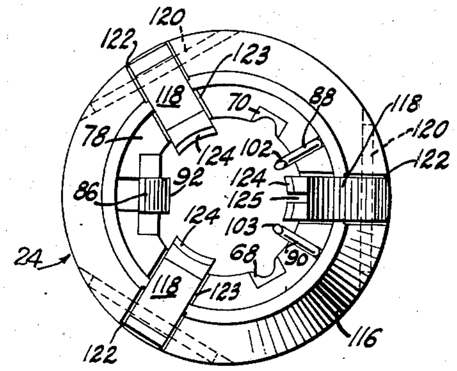
Fig. 6 is a view from beneath a portion of the apparatus showing the socket inserting means and means for retaining the sockets in the magazine.

Referring to Fig. 6, the socket inserting means 24 is concentrically mounted for reciprocating movement along the vertical or operational axis of the magazine on the exterior of the sleeve 78 and comprises a slidable collar 116 which has, in the embodiment of the invention shown, three depending inwardly inclined socket grasping fingers 118. Each of the fingers is pivotally mounted at one end on a pin 120 in a recess 122 formed in the collar 116. The free end of each of the fingers passes through the inner sleeve 78 in a slot 123 and has a socket grasping lip 124 shaped to conform to a portion of the socket configuration. If clearance is necessary, during the operation of the head, between a finger and any part of the socket, such as the solder lugs 40, a clearance groove 125 may be provided in the end of the finger (see Fig. 6). The fingers are all forced inwardly by a common circular or garter coil spring 126 which is retained in a groove formed in the fingers intermediate their ends. The separation between the free ends of the fingers, after the socket has been inserted in the board but prior to reloading of the head, is limited by the wall 127 of the collar 116 to a distance somewhat larger than the diameter of the top surface of the socket housing 38, but smaller than the diameter of the annular shoulder 48.

The slidable collar 116 is attached to a split block 128 which has an arm 130 extending between the collar and a slideway 132 formed in the block 84. The arm prevents the rotation of the block 128 about the sleeve 78 as the block is reciprocated since the arm can only move vertically in the slideway 132. A circular key or C-ring 134 (see Fig. 10) is used to retain the magazine in the block 128 when the split blocks are loosened to rotate the position of the sockets to be inserted. Rotation of the magazine and of the inserting head is performed simultaneously since the fingers 118 pass through slots 123 formed in the sleeve 78.

The reciprocation of the head 24 is produced by the operation of the fluid motor 136 through a toggle linkage 137. Upper link 138 is mounted on a vertically adjustable pivot 140 in the block 83. Lower link 142 is attached at one end to the arm 130, at a point intermediate the portion of the arm in the slideway 132 and the collar 116, and passes through an opening 144 in the block 84. The upper and lower toggle links are pivotally joined to the knuckle block 146 which is fastened to the end of the ram 148 of the fluid motor 136. The maximum descent and elevation of the inserting head 24 can be adjusted by moving the pivot point toward or away from the insertion position, thus raising or lowering the entire toggle operated mechanism. The cylinder of the fluid motor is mounted for pivotal movement, which occurs during the operation of the apparatus, on a pin 150 affixed to the frame 62.

The synchronously operated chassis support or socket fastening means 58 includes a tool 152, affixed to the ram 154 of fluid motor 156. The fluid motor is mounted on the base member 66 beneath the chassis position and in registration with the inserting head 24.

The apparatus herein described inserts the leads of oriented sockets, one at a time, into pre-formed apertures in a properly positioned apertured printed circuit board. A plurality of oriented sockets 22 are placed in the magazine 20 of the apparatus with the aligning protrusions 50, 52 on the sockets in registration with the channel members 68, 70 and the socket flat 54 in registration with the rail 72, by means of the socket package identified in the aforementioned United States application, Serial Number 617,425. The sockets are allowed to descend in the magazine until the bottommost socket 26 contacts the lip 92 on the flat spring 86 and the inturned ends 102, 103 of the wire springs 88, 90. The stack of sockets is supported in the magazine by cooperation of the spring members.

Figure 10:
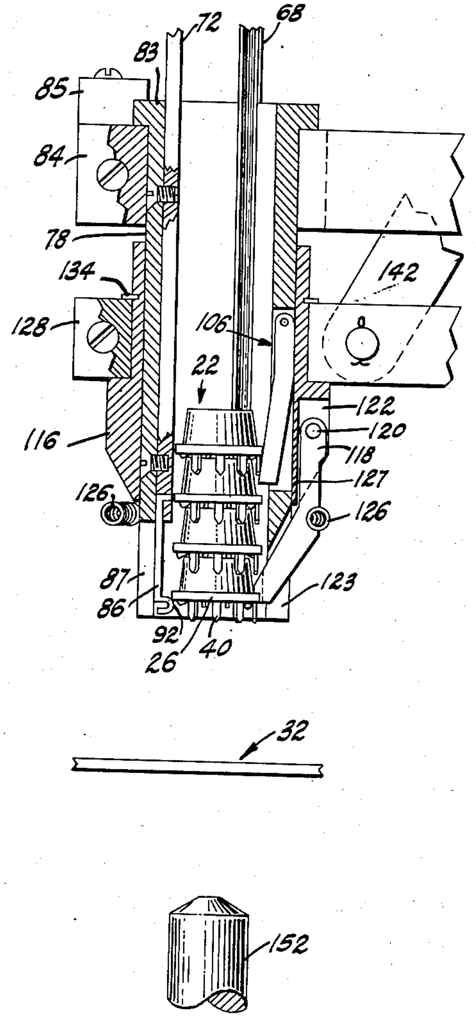
Fig. 10 is a cross section of the inserting head and magazine shown with the bottommost socket positioned in the insertion head subsequent to the start of the insertion cycle.
Figure 11:
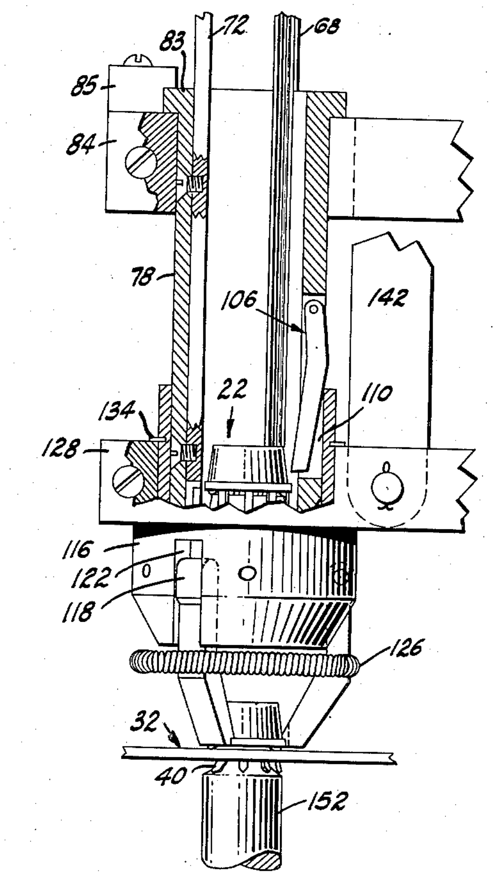
Fig. 11 is a partial cross section of the insertion head and magazine shown in the socket insertion position.

The operation of the apparatus will be more readily understood if the description is begun when the insertion cycle is initiated. A socket is shown in Fig. 10 grasped between the lips 124 of the fingers 118 of the inserting head 24 with the head in its upper or retracted position. A printed circuit board 32 is delivered beneath the head by the indexing operation of the conveyor 56 and control means (not shown) on the conveyor causes fluid pressure to be admitted to the main fluid motor 136. Energization of the fluid motor causes the ram 148 to advance, thus moving the knuckle block 146 toward the left in Fig. 1. The toggle links 138 and 142, which are connected to the knuckle block, advance from the retracted position shown in phantom lines in Fig. 1 to the erected position shown in solid lines. The erection of the toggle linkage causes the grasped socket to be forced past the flat spring 86 and the wire springs 88, 90 by the head 24 and carried to the socket inserting position wherein the solder lugs 40 are passed through the apertures 60 in the chassis 32. As the bottommost socket is removed, the socket stack descends by gravity, thus replacing the socket which was removed at the socket loading position 28, the previous penultimate socket thus becoming the bottommost socket. Control means (not shown) on the conveyor are operated to cause the application of fluid pressure of fluid motor 156 which causes the ram 154 to advance carrying the tool 152 to its operative position beneath the board. The tool as shown is a stacking tool which bends the solder lugs 40 thus locking the socket in the chassis. Alternate tools may be provided which are advanced to support the board 32 prior to the socket insertion. When the tool 152 is used for support only, reliance is placed on the configuration and springiness of the solder lugs 40 to retain the socket in the board when the inserting fingers 118 are retracted. After performing its assigned function, the tool 152 is retracted.

After the socket has been inserted in the printed circuit board, the fluid motor control means (not shown) causes the direction of fluid pressure applied to the fluid motor 136 to be reversed causing the toggle linkage 137 to be collapsed. This collapse causes the upward movement of the inserting head 24 to the socket loading position 28.

Figure 12:
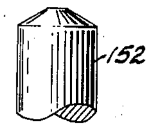
Fig. 12 is a cross section of the inserting head and magazine showing the sockets in the magazine restrained from the vertical movement prior to the bottommost socket being passed into the inserting head.

Referring to Fig. 12, when the inserting head is being retracted and moved upwardly the socket transfer fingers 118 slide off the shoulder of the socket inserted in the board and are forced by their coil spring 126 to assume their most inwardly inclined position. It is while being raised in this position that they encounter the former penultimate, now bottommost, socket 26 held for pickup by the inserting means in the magazine 20 at the socket loading position 28. Before the contact of the fingers and the socket occurs the slidable collar 116 portion of the inserting head 24 cams the free end 114 of the restraining pawls 106 into the interior of the sleeve 78. The upwardly moving fingers 118 lift the stack of sockets 22 in the magazine until the annular shoulder 48 of one of the upper sockets contacts the free end 114 of the pawl 106, the pawl then restrains the further upward movement of the sockets. As the inserting head continues to rise the fingers 118 are spread apart, against the force of the spring 126, by being pushed against the socket 26. The head continues to rise until the fingers snap over the shoulder of the socket 26 thus passing the socket through and into the inserting means and seating the socket in the lip 124 of the fingers. Once the socket has been seated the head is in position for the performance of the next inserting operation which occurs on the downstroke of the head after the conveyor has been indexed.

Frequently model changes will demand a change in the circuit configuration of the printed circuit board 32 utilized. When such a change is made the necessary compensations in component placement may be made by loosening the split blocks 80, 82, 84, 128 and clamp 85. Once these have been loosened the magazine 20 and inserting fingers 118 may be rotated to the new position about the operational axis of the apparatus. Additionally, the entire apparatus may be shifted transversely of the conveyor by loosening the conventional fastening means attached to the base 66.

Although several embodiments of the invention have been shown and described, it will be apparent to those skilled in the art that various changes and modifications may be made therein without departing from the scope of the invention as defined by the appended claims.

What is claimed is:

1. In an apparatus for inserting the leads of components into an apertured electrical chassis the combination of a vertical magazine for maintaining a plurality of components in an oriented position relative to the vertical axis of said magazine, component lead inserting means mounted for reciprocating movement along said vertical axis of said magazine from a loading position at said magazine to a component lead inserting position at said chassis, means for releasably retaining the bottommost component in said magazine at said component loading position, means mounted on said magazine adjacent said loading position and operable by said inserting means to restrain the movement of the components in said magazine while said component lead inserting means is raised whereby said bottommost component is passed through and into said component inserting means, means for moving said inserting means, and means for fastening said component leads in said apertures in said chassis operable in synchronism with said inserting means when said component is inserted in said chassis.

2. In an apparatus for inserting the leads of components into an apertured electrical chassis the combination of a vertical magazine for maintaining a plurality of components in an oriented position relative to the vertical axis of said magazine, component lead inserting means mounted for reciprocating movement along said vertical axis of said magazine from a loading position at said magazine to a component lead inserting position at said chassis, means for releasably retaining the bottommost component in said magazine at said component loading position, means mounted on said magazine adjacent said loading position and operable by said inserting means to restrain the movement of the components in said magazine while said component lead inserting means is raised whereby said bottommost component is passed through and into said component inserting means, and means for moving said inserting means.

3. In an apparatus for inserting the leads of components into an apertured electrical chassis the combination of a vertical magazine for maintaining a plurality of components in an oriented position relative to the vertical axis of said magazine, component lead inserting means mounted for reciprocating movement along said vertical axis of said magazine from a loading position at said magazine to a component lead inserting position at said chassis, means for releasably retaining the bottommost component in said magazine at said component loading position, means mounted on said magazine adjacent said loading position and operable by said inserting means to restrain the movement of the components in said magazine while said component lead inserting means is raised whereby said bottommost component is passed through and into said component inserting means, said movement restraining means including a plurality of inserting means operated cam surfaced component engaging pawls, means for moving said inserting means, and means for fastening said component in said apertures in said chassis operable in synchronism with said inserting means when said component is inserted in said chassis.

4. In an apparatus for assembling components having a plurality of leads depending therefrom to an apertured electrical chassis the combination of a magazine for maintaining a plurality of components in lead depending serial stacked array oriented about the vertical axis of said magazine; component lead inserting means mounted for reciprocating movement along said vertical axis of said magazine from a loading position at the lower end of said magazine to a lead inserting position at said chassis including a collar member slidably mounted on said magazine having a plurality of spring-loaded component grasping fingers depending therefrom; means at said loading position for releasably restraining the downward movement of said components through said magazine; means mounted on said magazine and actuated by said inserting means for arresting the upward movement of said components away from said loading position including a plurality of component engaging pawls actuated by said inserting means; means for reciprocating said inserting means, said reciprocation causing the movement of said inserting means relative to said arrested component in said loading position thereby loading said component into said inserting means by forcing said arrested component between said moving component grasping fingers; and means for fastening said component leads in said apertures in said chassis operable in synchronism with said inserting means.

5. In an apparatus for assembling components having leads to an apertured electrical chassis, the combination comprising means for holding a stack of components in pre-oriented position about a given operational axis; component inserting means mounted for reciprocating movement along said axis of said stack from a loading position at said stack to a component lead inserting position at said chassis for inserting the leads of the bottommost component from said stack of components into said apertures in said chassis; means for releasably retaining the bottommost component in said stack at said component loading position; component arresting means actuatable by said inserting means for arresting the movement of said bottommost component in said stack for pickup by said inserting means upon approach of said inserting means to said loading position; and means for moving said inserting means.

6. In an apparatus for assembling components having leads to an apertured electrical chassis, the combination comprising means for holding a stack of components in pre-oriented position about a given operational axis; component inserting means mounted for reciprocating movement along said axis of said stack from a loading position at said stack to a component lead inserting position at said chassis for inserting the leads of the bottommost component from said stack of components into said apertures in said chassis, said inserting means including a plurality of depending component grasping fingers; means for releasably retaining the bottommost component in said stack at said loading position; component arresting means actuatable by said inserting means for arresting movement of said bottommost component in said stack for pickup by said inserting means upon approach of said inserting means to said loading position; and means for moving said inserting means.

7. In an apparatus for assembling components having leads to an apertured electrical chassis, the combination comprising means for holding a stack of components in pre-oriented position about a given operational axis; component inserting means mounted for reciprocating movement along said axis of said stack from a loading position at said stack to a component lead inserting position at said chassis for inserting the leads of the bottommost component from said stack of components into said apertures in said chassis, said inserting means including a plurality of dependent component grasping fingers; means for releasably retaining the bottommost component in said stack at said component loading position; means for arresting the movement of said bottommost component in said stack for pickup by said grasping fingers of said inserting means upon approach of said inserting means to said loading position, said component arresting means including a plurality of component engaging pawls; and means for moving said inserting means.

8. In an apparatus for assembling components having leads to an apertured electrical chassis, the combination comprising means for holding a stack of components in a pre-oriented position about a given operational axis; component inserting means mounted for reciprocating movement along said axis of said stack from a loading position at said stack to a component lead inserting position at said chassis for inserting the leads of the bottommost component from said stack of components into said apertures in said chassis; means for releasably retaining the bottommost component in said stack at said component loading position; component movement arresting means actuatable by said inserting means for arresting the movement of said bottommost component in said stack for pickup by said inserting means upon approach of said inserting means to said loading position; means for moving said inserting means; and means for supporting said inserting means, said holding means, and said arresting means for rotational adjustment about said operational axis.

References Cited in the file of this patent

UNITED STATES PATENTS

| | | |
|---|---|---|
| 692,180 | Clark | Jan. 28, 1902 |
| 968,863 | Mackay | Aug. 30, 1910 |
| 1,151,273 | Jost | Aug. 24, 1915 |
| 1,396,995 | Cooley | Nov. 15, 1921 |
| 1,636,208 | Bergmann | July 19, 1927 |
| 2,690,561 | Scheurmann | Oct. 5, 1954 |
| 2,843,923 | Mackenzie | July 22, 1958 |